United States Patent
Kwatra et al.

(10) Patent No.: US 11,647,033 B2
(45) Date of Patent: May 9, 2023

(54) DEVICE AGNOSTIC DISCOVERY AND SELF-HEALING CONSENSUS NETWORK

(71) Applicant: International Business Machines Corporation, Armonk, NY (US)

(72) Inventors: Shikhar Kwatra, Durham, NC (US); Matthew Alzamora, Poughkeepsie, NY (US); Adam Lee Griffin, Dubuque, IA (US); Christopher Denis Hardt, Hyde Park, NY (US); Patricia Wynne McHann, Hernando, MS (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/690,580

(22) Filed: Nov. 21, 2019

(65) Prior Publication Data

US 2021/0160261 A1    May 27, 2021

(51) Int. Cl.
*H04L 9/40* (2022.01)
*G06N 5/04* (2023.01)
*G06N 20/00* (2019.01)

(52) U.S. Cl.
CPC ........... *H04L 63/1425* (2013.01); *G06N 5/04* (2013.01); *G06N 20/00* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 6,088,141 A | 7/2000 | Merli et al. | |
| 7,437,596 B2 | 10/2008 | McFarland | |
| 8,407,240 B2 | 3/2013 | Denton | |
| 9,344,437 B2 * | 5/2016 | Svigals | H04L 63/0838 |
| 2007/0157313 A1 * | 7/2007 | Denton | G06F 21/6218 726/22 |
| 2008/0068217 A1 | 3/2008 | Van Wyk et al. | |
| 2018/0302290 A1 | 10/2018 | Rahman et al. | |
| 2019/0120929 A1 * | 4/2019 | Meadow | G01S 5/0221 |
| 2019/0123580 A1 | 4/2019 | Bindea et al. | |
| 2019/0273739 A1 * | 9/2019 | Pemmaraju | H04L 63/1416 |
| 2020/0162503 A1 * | 5/2020 | Shurtleff | H04L 41/0883 |
| 2020/0162517 A1 * | 5/2020 | Wong | H04W 12/12 |

(Continued)

FOREIGN PATENT DOCUMENTS

CA    1291549 C    10/1991

OTHER PUBLICATIONS

Ongaro et al., "In Search of an Understandable Consensus Algorithm," Proceedings of USENIX ATC '14: 2014 USENIX Annual Technical Conference, Jun. 2014, pp. 205-319.

(Continued)

*Primary Examiner* — Cai Y Chen
(74) *Attorney, Agent, or Firm* — Mark Bergner (57) ABSTRACT

A computer-implemented system and method for device discovery and recovery in a secure network comprises registering a plurality of devices, where the devices form the secure network at a location. Communication between the plurality of registered devices is enabled, and messages passed between the plurality of devices are collected. The method further comprises determining which one of the plurality of devices is a compromised device by using a consensus network that includes the plurality of devices of the secure network.

16 Claims, 5 Drawing Sheets

(56) References Cited

U.S. PATENT DOCUMENTS

2020/0412764 A1* 12/2020 May .................... H04L 41/0246
2021/0105869 A1*  4/2021 Mo ..................... H04L 41/5029

OTHER PUBLICATIONS

Tummalapenta et al., "Secure Environment Device Management," U.S. Appl. No. 16/100,513, filed Aug. 10, 2018.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

DEVICE AGNOSTIC DISCOVERY AND SELF-HEALING CONSENSUS NETWORK

BACKGROUND

Disclosed herein is a system and related method for allowing individuals having a visual (or possibly other) impairment to use a transportation system utilizing 5G communications. The use of 5G technologies may allow for more efficient and effective communications for all entities involved in a transportation system.

SUMMARY

According to one aspect disclosed herein, a computer-implemented method for device discovery and recovery in a secure network is provided comprising registering a plurality of devices, wherein the devices form the secure network at a location. Communication between the plurality of registered devices is enabled, and messages passed between the plurality of devices are collected. The method further comprises determining which one of the plurality of devices is a compromised device by using a consensus network that includes the plurality of devices of the secure network.

According to another aspect disclosed herein, a device in a secure network is provided comprising a processor configured to register a plurality of devices, wherein the devices form the secure network at a location and enable communication between the plurality of devices. The processor collects messages passed between the plurality of devices, and determines which one of the plurality of devices is a compromised device by using a consensus network that includes the plurality of devices of the secure network.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

In order to better detect problems with devices in a secure network environment, consensus network features may allow problems to be recognized and dealt with by other device members in the network. Potential problems may be determined based on machine learning that helps classify potential problem devices from those operating normally. However, when a problem is detected, a consensus is reached with other devices in the network before notifying a user or taking other defensive actions.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network
Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
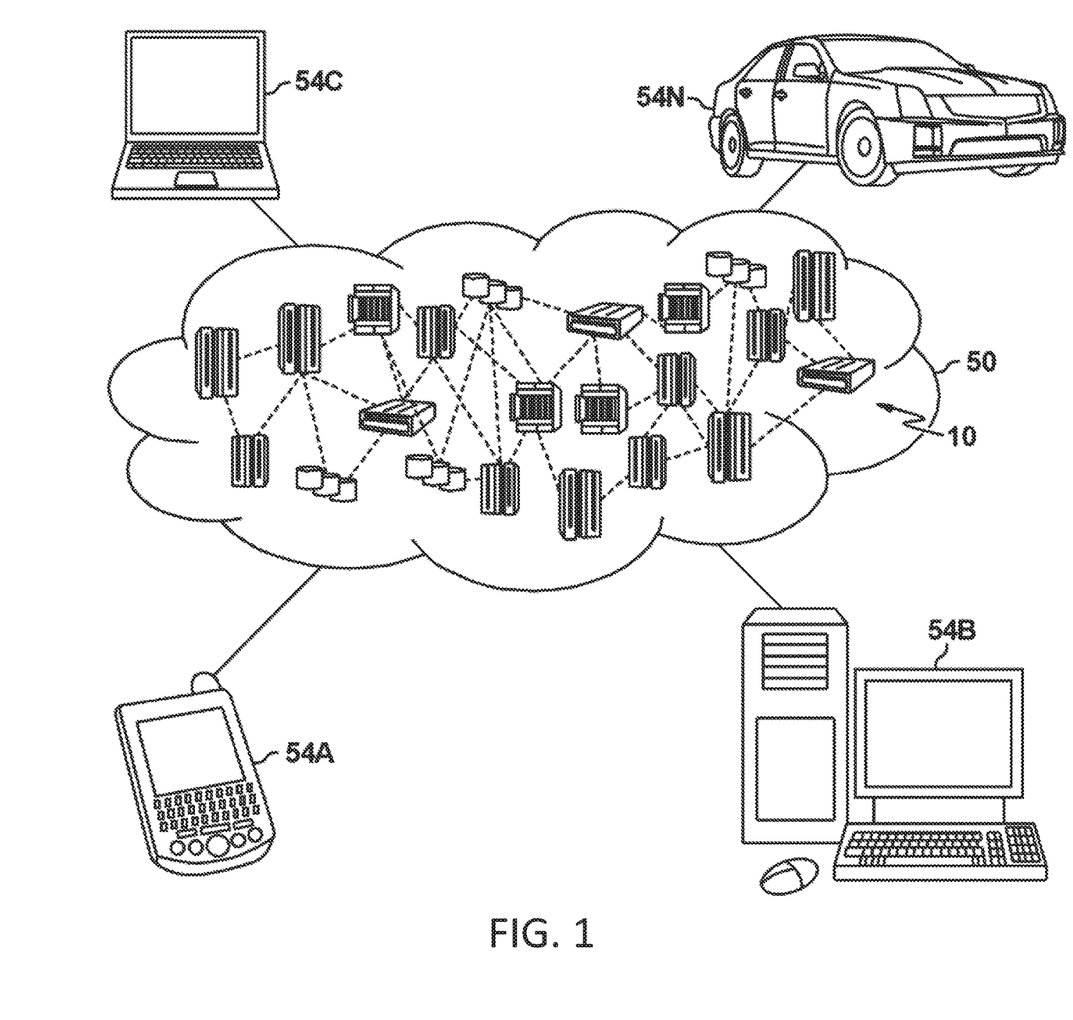
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
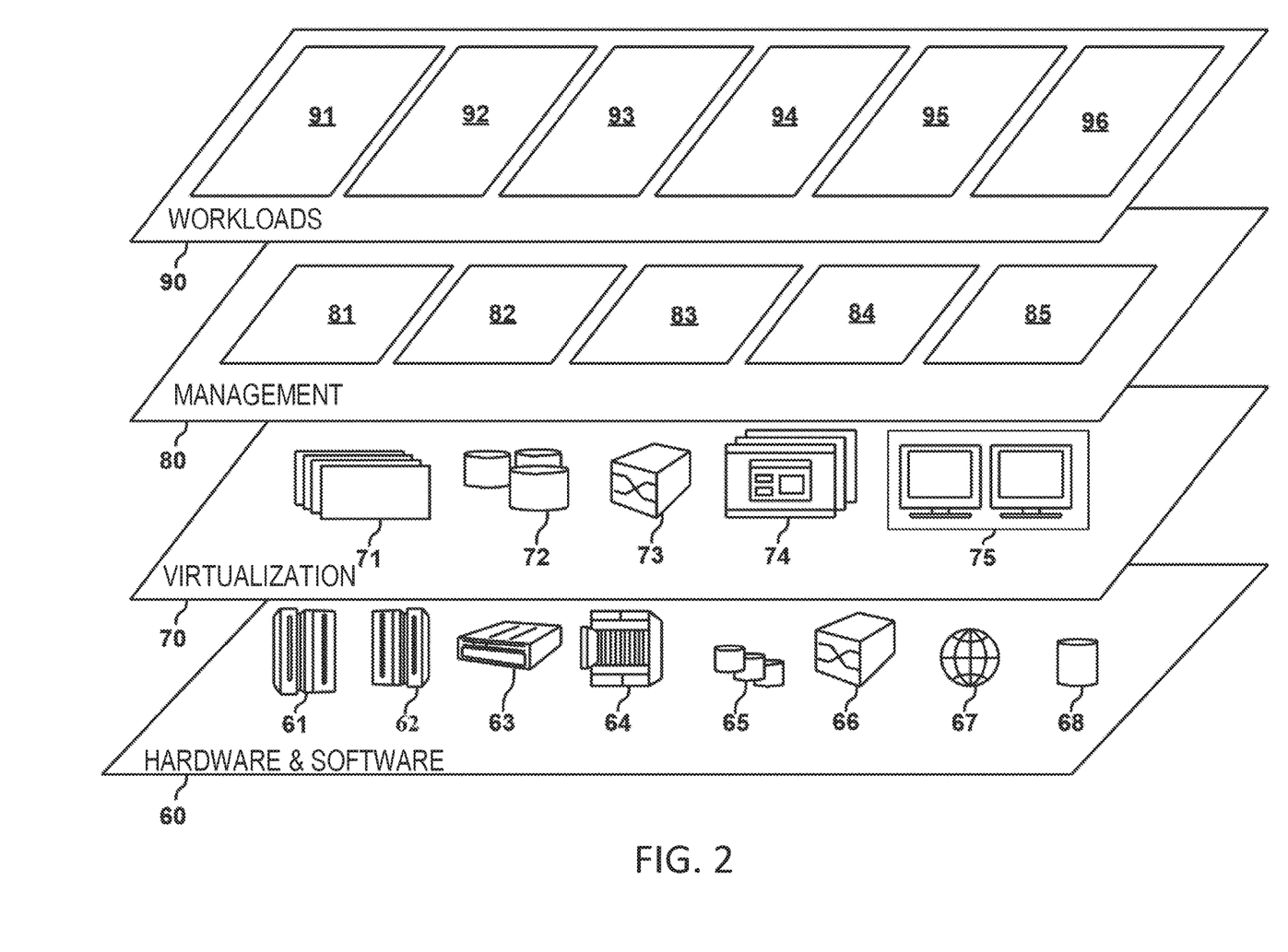
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
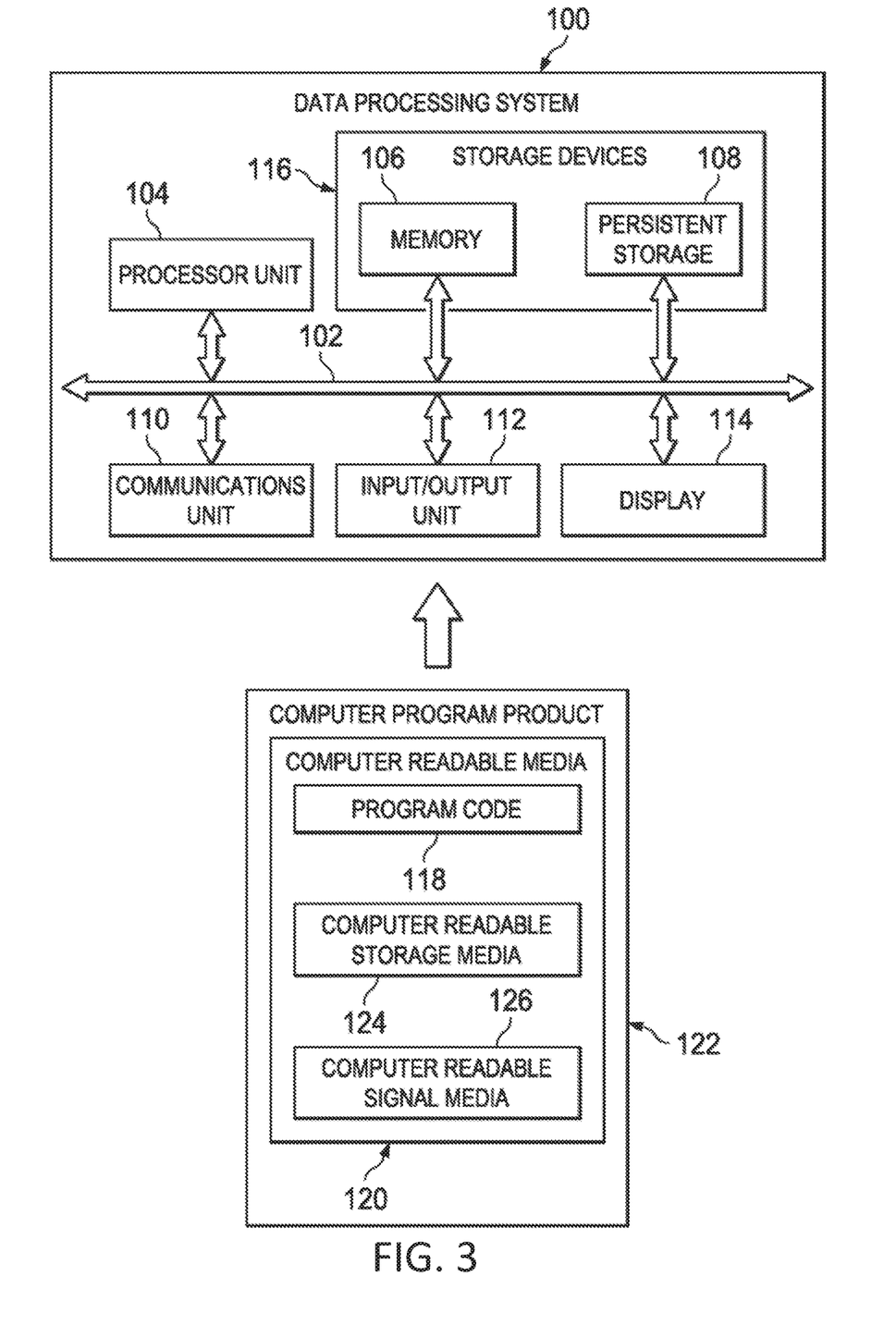
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Fifth generation (5G) technology refers to the next generation of wireless technology that is replacing the fourth-generation long-term evolution (4G LTE) standard. 5G mobile networks and wireless systems, involve telecommunications standards beyond the current 4G/international mobile telecommunications (IMT)-Advanced standards. 5G communications have a higher capacity than 4G, communications allowing a higher density of mobile broadband users, and supporting device-to-device, more reliable, and massive machine communications. 5G communications equipment also has a lower latency than 4G equipment and lower battery consumption, allowing, e.g., a better implementation of the Internet of Things.

The evolution of networking has resulted in the interconnectivity of large numbers of devices—a trend which shows no signs of abating. While such levels of interconnectivity and accessibility have great benefits, they also have drawbacks. A primary drawback is that malicious elements may also have access to devices that have been networked for easy access. Providing adequate security for devices while at the same time allowing easy access to the devices and data they produce or consume to legitimate elements is an ongoing struggle. To protect against unauthorized access and attacks against devices, many different security measures have been developed. These security measures, such as the use of passwords or authenticating codes, firewalls, and protocol-specific security may provide a base level of security, but such security may be improved upon.

The disclosure herein presents a novel mechanism to improve upon network and interconnected device security by way of a consensus network. The consensus network may include all or only a subset of the devices involved in the secure network. The consensus network allows multiple devices in a network to sense a network or device problem and "vote" on whether a problem exists, which device(s) may be impacted, and what the proper corrective action to take is. Furthermore, in the event that a number of devices within the network are being simultaneously attacked, the device owners may not be able to operate the collective ecosystem within which the devices operate properly. Additionally, the ability of a single or a number of devices within the network to communicate with the device owner might also be disrupted. By way of illustrative example, if a device owner (user) has five smart devices, and one of them (e.g., a fifth device) receives a distributed denial of service (DDOS) attack, the fifth device may stop operating or at least communicating, and there is no way to diagnose the problem when communications are lost with the main server or with the device owners' dashboard and/or centralized command processor. Historically, in such a situation, the user would manually poll the device (possibly included all other devices in the network) or perform a series of diagnostics without having prior knowledge of what is happening in the attack. Under these circumstances, the complexity of discovering the right device to address is great.

As IoT and other smart devices become ever more prevalent, smart networks, such as home networks, will need stronger authentication, such as assured biometric identification. IoT devices and sensors will demand more complex authentication to prevent unauthorized access.

Various embodiments of the system and method disclosed herein provide for multiple devices operating within a network to be capable of identifying the anomalous or dysfunctional behavior being exhibited in or related to one of the devices based on a dynamic consensus algorithm. In some embodiments, a corrective action strategy may be performed based on this consensus, such as isolating or removing the device from the trusted ring or network. The devices within the network may have consensus network components installed on them that permits them to make use of dynamic discovery, without interfering with the user or other activities within the network. The consensus network components allow polling and a final decision action to be taken by the other nodes to remove or disable the failed node without user interference. With such a configuration, even though the user may not be consistently checking to test/validate the functionality of every device, various embodiments described herein may provide consistent checks/validation to ensure safe and proper operation of network devices.

Figure 4:
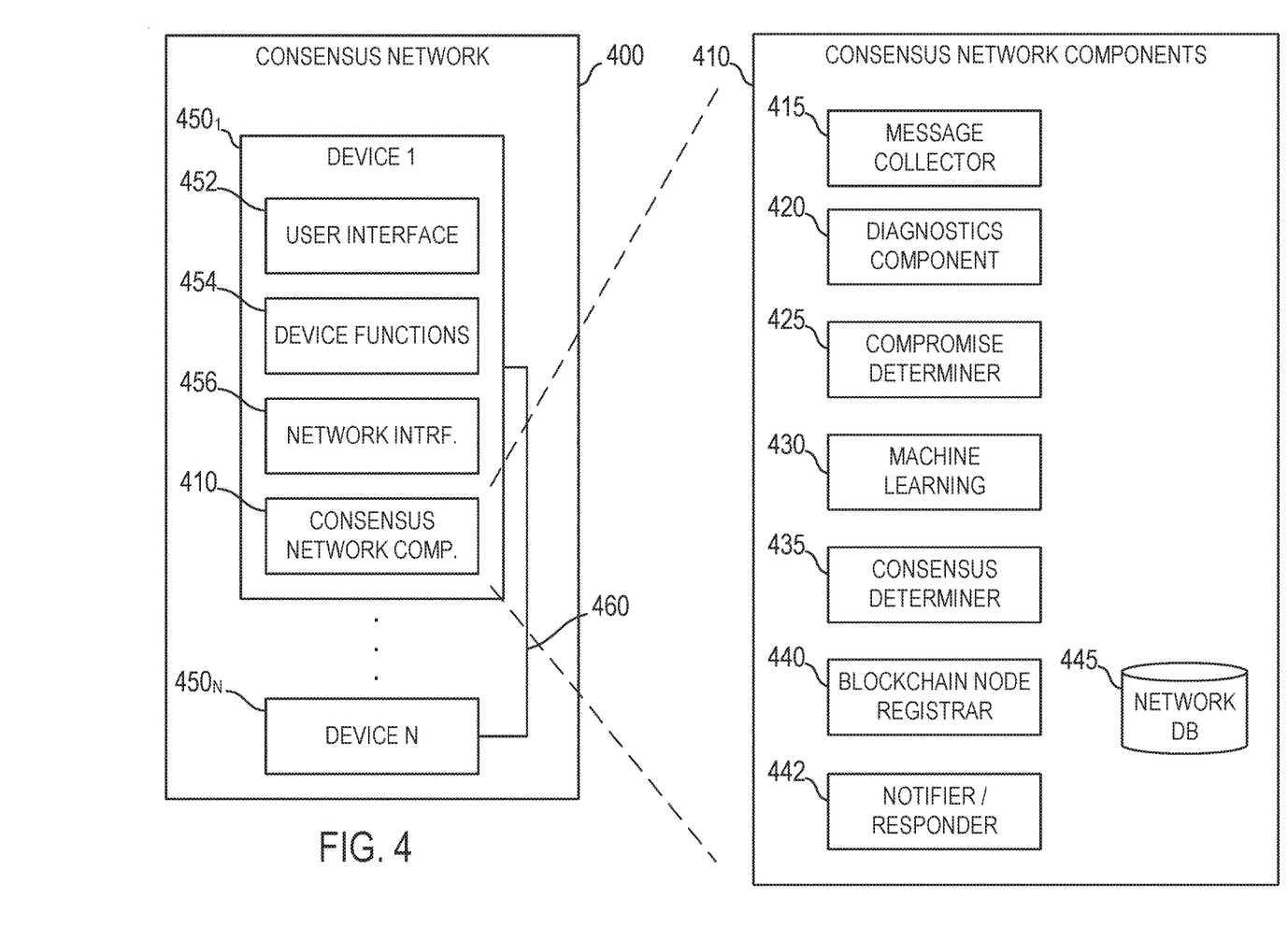
FIG. 4 is a block diagram of one or more embodiments of a consensus network system, according to some implementations.

FIG. 4 is a block diagram illustrating various components in a consensus network 400, according to some embodiments. The consensus network 400 comprises a plurality of devices $450_1$ to $450_N$ (a device representatively or group of devices collectively may be referenced by reference number 450) that are interconnected by a wired or wireless (physical) physical network 460. The devices 450 may be in the form of a DPS 100, as described above, and may include smart devices, some of which may have a user interface 452. The device user interface 452 may have an input (e.g., keyboard, touch screen, microphone, buttons, etc.) and/or an output (display screen, speaker, LED, haptic, etc.), although devices may vary as to the capabilities of the user interface 452—for example, some devices 450 may have high resolution LED displays, where others may have a single LED, or no output at all.

The device $450_1$ has its normal device functions 454. For example, a smart refrigerator would obviously have normal device functions 454 for keeping its contents cold. However, the device $450_1$ also has consensus network functions 410, which are discussed in more detail below. A network interface 456 may be provided in order to allow connectivity of the device $450_1$ to the physical network 460 and to allow communication via the physical network 460. The devices 450 within the physical network 460 may have some level of trust between them and may be partially protected from other components in a wide area network (WAN) via tools such as gateways, routers, and the like. The physical network 460 itself may be any form of a wired or wireless network, such as Wi-Fi®, Bluetooth, 4G, 5G, or other network form or combination.

All or a plurality of devices within the consensus network 400 comprise consensus network components 410, which may be implemented as hardware, software, or a combination of both. Certain of these network components 410 may be located on the device $450_1$ itself, on a server or network service in a cloud, or in any combination (e.g., split functionality across the device and server/service). These network components 410 may include, e.g., a message collector 415, a diagnostics component 420, a compromise determiner 425, a machine learning component 430, a consensus determiner 435, a node registrar 440, a notifier/responder 442, and a network database 445. Not all of the devices 450 are capable of hosting all of the network components. For example, a smart light bulb as a device $450_1$ may not have sufficient resources to host a machine learning component 430 or a consensus determiner 435. Each of the devices 450 may register their capabilities for hosting various network components (and respective versions of them). An additional device $450_1$ may be added to a physical network 460 when all of the devices within the consensus network 400 do not collectively provide the functionality of all of the network components 410. For example, a consensus network 400 comprising solely smart light bulbs as the devices 450 in the network may require an additional (possibly dedicated) device $450_1$ or devices in order to operate as a consensus network 400. Although a consensus network 400 may be operable with a single consensus-functioning device, the benefits of using a consensus architecture are not realized with a single voting member.

In describing various embodiments, it may be helpful to make reference to one or more use case examples. In one such example, a user may have various devices 450, such as a Philips Hue® lighting system, a smart refrigerator, a Wi-Fi® door lock, an Amazon Alexa®, a security camera, etc., that are all connected via a Wi-Fi® physical network 460 that are registered with the user's router. In this configuration, the only mode of user interaction with these devices 450 is through the user's smart phone (which may also be considered a device $450_1$ within the physical network 460), although the user may have access to these devices 450 via a personal desktop computer, which may also be considered a device $450_1$ as well. In the use case, the user may register each device $450_1$ with the physical network 460, and relevant information related to the physical network 460 as well as devices 450 within the network may be stored in the network database 445.

In some implementations, the physical network 460 may contain devices 450 that all perform primary functions other than consensus network functions. In other implementations, a dedicated device $450_1$ may be provided for consensus network functionality. Where a device's user interface 452 has the capability of a display, the display functionality may comprise a personalized dashboard that may be utilized to register the various network devices 450 within the physical network 460. Such a dashboard may be an IoT dashboard when IoT devices are registered in the physical network 460. Devices 450 may be registered with the physical network 460 by being, e.g., added manually and/or automatically for home or commercial usage. Examples for adding devices may include using a single manual click to add the device (which may apply to deletion of the device as well), smart discovery via Bluetooth,® Wi-Fi®, 5G, etc. Various data associated with a specific product identifier may be captured and stored in the network database 445 during registration. Such data may include, e.g., product registrations, MAC ID, product ID, model number/serial number, etc.

The network database 445 may further comprise consensus network information for the various devices 450 that may be installed on the physical network 460. This information may indicate specific consensus network components 410 that may be installed on specific devices 450. For example, a smart refrigerator may comprise a 1024×768 LED display, and thus this refrigerator may be capable of running a consensus network component 410 for displaying graphical results of, e.g., a device health status summary for the network. Conversely, a networked door lock may have no such display on it, and thus would not have an ability to provide such an overall summary for the network.

The physical network 460 may make use of machine-to-machine (M2M) enabled communication protocols that are either manually configured or may be automatically configured based on juxtaposing different packets together as part of the ring of trusted devices 450. Any or all of three major groups of protocols may be utilized for M2M communications. A first group of protocols may include service-oriented architectures (SOA), which are used in industrial automation systems to exchange soft real-time data for instance between programmable logic controllers and supervisory control and data acquisition (SCADA) systems. A second group of protocols may include a representational state transfer (REST) architecture style, which defines constraints to the used components, connectors, and data elements. A third group of protocols may include message-oriented protocols that support the asynchronous data transfer between devices and components of the distributed system.

In order to determine the presence of an anomaly that may indicate a problem, messages to and from each of the devices 450 within the physical network 460 may be collected and analyzed. Message information may be collected and analyzed at a single device $450_1$ or may be collected on many (or all) of the devices 450 in the network to determine the presence of a potential anomaly of a node. Keeping the functionality of the message collector 415 with a single device $450_1$ runs a risk that this functionality may be disabled if this device $450_1$ is the one under attack. Therefore, in some embodiments, functionality for the message collector 415, as well as other consensus network components 410, are performed on as many devices 450 of the physical network 460 as possible to ensure that any one device $450_1$ in the physical network 460 under attack does not become the single point of failure in the consensus network.

The message collector 415 may collect and label network traffic data from devices 450 deployed in the physical network 460. For example, TCP/IP network data and packet data corresponding to device identifiers may be used for classification and creating nodes corresponding to devices 450 discovered on the physical network 460. An example follows: an initial set of devices 450 (D1, D2, D3) are already connected to the network, and then m devices 450 are added to the network whose information source/context is unknown. Every device $450_1$ has an identifier D[device num] and packet type H being monitored. In this example, D={d1,d2, ... dn} are listed being as being connected to the network but are initially unknown and the devices 450 are not added to the physical network 460. A labeled training dataset DS[training] may be used for inducing a multiclass classifier that includes feature vectors representing sessions of devices 450 whose types are in D.

The machine learning component 430 may be utilized for model training, and may form a part of the diagnostics component. In some embodiments, a Random Forest machine learning algorithm may be used. The Random Forest algorithm may be applied to the labeled training dataset DS[training] to induce a single-session-based multiclass classifier C for IoT device types.

When applied to a single session s, classifier C outputs a vector of posterior probabilities P={P1, P2, ... Pn}. Each probability p denotes the likelihood of the inspected session s to originate from device type D. Tr, a threshold parameter, may be user defined based on device identification: i.e., when R-CNN predicts >0.65 as a matching classifier, then device X has higher weight and packets can be monitored in a sequential fashion knowing it most likely belongs to a certain category of devices identified in, e.g., a cloud database where the algorithm is running and the user's devices are stored with the user ID in the cloud, for deriving the classification of a single session given the vector of probabilities Ps.

The following features are examples of those that may be used for correctly classifying IP streams from an IoT device:

ttl_min: TCP packet time-to-live (TTL), minimum (feature importance 0.038)

ttl_firstQ: TCP packet time-to-live, first quartile (0.033)

ttl_avg: TCP packet time-to-live, average (0.025)

TABLE 1

Device Type Features

| device type left out | feature #1 (most important) | feature #2 | feature #3 |
|---|---|---|---|
| baby_monitor | ttl_min 0.038 | ttl_firstQ 0.033 | ttl_avg 0.025 |
| smoke_detector | ttl_min 0.046 | ttl_B_min 0.032 | ttl_firstQ 0.028 |
| socket | ttl_min 0.045 | ttl_B_min 0.039 | ssl_dom_server_name_alexaRank |
| TV | ttl_min 0.049 | ttl_firstQ 0.033 | ttl_avg 0.032 |
| refrigerator | ttl_min 0.048 | ttl_B_min 0.039 | ttl_firstQ 0.034 |
| thermostat | ttl_min 0.044 | ttl_B_min 0.031 | ttl_avg 0.024 |
| motion_sensor | ttl_min 0.048 | ttl_B_min 0.033 | ttl_firstQ 0.027 |
| security_camera | ttl_min 0.047 | ttl_B_min 0.038 | ttl_firstQ 0.034 |
| watch | ttl_min 0.039 | ttl_B_min 0.035 | ttl_firstQ 0.026 |

```
from
sklearn.ensemble import RandomForestClassifier.
X=['ttl_min', 'ttl_firstQ', 'ttl_avg']
y=[object table in vectors] #Create a Gaussian Classifier
clf=RandomForestClassifier(n_estimators=100)
#Train the model using the training sets
    y_pred=clf.predict(X_test) clf.fit(X_train,y_train)
y_pred=clf.predict(X_test)
```

In general, the random forest classification potentially consists of many individual decision trees that operate as an ensemble. Here, the IP streams are introduced, and each individual tree in the random forest delineates a class prediction. The class with the most "votes" becomes the model's prediction aid in the determination of normal versus abnormal behavior.

The above sample code illustrates how device types themselves may be classified, however, the same principles may be utilized to distinguish "normal" behavior for the device vs. "abnormal" behavior, and even to further classify different types of "abnormal" behavior for different types of devices. The Gaussian classifier is implemented to further classify IP streams from IoT devices, and/or use case/samples/data types of each class using equal prior class probabilities and specified probabilities. The nearest mean classifier is implemented to classify the IP stream of each class using equal prior class probabilities. This provides data driven predictions to aid in normal versus abnormal behavior By way of example, a security camera may, under normal operating conditions, produce a large volume of data (e.g., 5 MB/hr.), whereas a refrigerator may, under normal operating conditions, produce a small volume of data (e.g., 5 KB/day). Normal operation may be established using the techniques described above. If the refrigerator begins producing data at a rate of 2 MB/hr., this may be indicative of an anomaly, whereas the security camera producing this volume of data would not be indicative of an anomaly. The classifier may thus be trained for each device 450 added to the physical network 460 to make such delineations.

By applying the above techniques, security may be substantially enhanced within the physical network 460. By way of example, the system may provide for intrusion detection and include prevention tools for blocking basic 5G security threats. Anomaly detection may make use of packet capture, big data, and machine learning to identify threats, and may be embedded into IoT devices 450, network switches, and routers, thus turning those network devices 450 into 5G security sensors. The tools may augment domain name server (DNS) intelligence by monitoring DNS activity, and protect against anything malicious. The tools may further provide threat intelligence that enables 5G providers and vendors with devices that can profile attacks and attackers.

The consensus determiner 435 may be utilized as a consensus algorithm to be used by the devices 450 in order to establish a secure communication framework. The consensus determiner may be utilized to identify anomalous/dysfunctional behavior being exhibited in one of the devices based on a consensus algorithm of the consensus determiner 435 and to take action when such behavior is identified. Consensus algorithms allow a collection of machines to work as a coherent group that can survive the failures of some of its members. One potential consensus algorithm is the Raft algorithm, which implements consensus by first electing a distinguished leader, then giving the leader complete responsibility for managing a replicated log. The leader accepts log entries from clients, replicates them on other servers, and tells servers when it is safe to apply log entries to their state machines. Having a leader simplifies the management of the replicated log. For example, the leader can decide where to place new entries in the log without consulting other servers, and data flows in a simple fashion from the leader to other servers.

One problem with having a leader (or single point of failure, as noted above) is that a leader can fail or become disconnected from the other devices. In this case, a new leader may be elected. Given the leader approach, the Raft algorithm decomposes the consensus problem into three relatively independent subproblems: leader election (a new leader must be chosen when an existing leader fails); log replication (the leader must accept log entries from clients and replicate them across the cluster, forcing the other logs to agree with its own); and safety (the key safety property for Raft is the State Machine Safety Property: if any server has applied a particular log entry to its state machine, then no other server may apply a different command for the same log index.

At any given time, each device 450 may be in one of three states: leader, follower, or candidate. In normal operation there is exactly one leader and all of the other devices 450 are followers. Followers are passive: they issue no requests on their own, but simply respond to requests from leaders and candidates. The leader handles all client requests (if a client contacts a follower, the follower redirects it to the leader). The third state, candidate, is used to elect a new leader. Raft divides time into terms of arbitrary length. Terms are numbered with consecutive integers. Each term begins with an election, in which one or more candidates attempt to become leader. If a candidate wins the election, then it serves as leader for the rest of the term. In some situations an election will result in a split vote. In this case the term will end with no leader; a new term (with a new election) will begin shortly. Raft ensures that there is at most one leader in a given term. Each server stores a current term number, which increases monotonically over time. Current terms are exchanged whenever servers communicate; if one server's current term is smaller than the others, then it updates its current term to the larger value. If a candidate or leader discovers that its term is out of date, it immediately reverts to follower state. If a server receives a request with a stale term number, it rejects the request. Raft servers may communicate using remote procedure calls (RPCs), and the consensus algorithm requires only two types of RPCs. RequestVote RPCs are initiated by candidates during elections, and AppendEntries RPCs are initiated by leaders to replicate log entries and to provide a form of heartbeat. Devices 450 may retry RPCs if they do not receive a response in a timely manner, and they issue RPCs in parallel for best performance.

The following code illustrates an example, according to some embodiments, of replicating results for nodes making a determination of a particular node having an anomaly that may then be the subject of a vote. It distinguishes between normal and abnormal activity, and the voting process is a part of the consensus algorithm.

```
Node replication across different devices in the storage component, let's call it
storeA, storeB, storeC, storeD, storeE
dict1 = ReplDict( )
syncobj = SyncObj('storeA', ['storeB:4321', 'storeC:4321'], consumers=[dict1])
dict1['somekey'] = 'somevalue'
# Get internal Raft cluster state
status_dict = self.sync_obj.getStatus( )
{
'readonly_nodes_count': ..., 'log_len': ..., 'unknown_connections_count': ...,
'last_applied': ...,
'uptime': ..., 'match_idx_count': ..., 'partner_nodes_count': ..., 'state': ...,
'leader_commit_idx': ..., 'next_node_idx_count': ..., 'commit_idx': ..., 'raft_term'
}
def send_metrics(self):
for key, value in \ self.sync_obj.getStatus( ).iteritems( ): metric_path
= "%s.s.%s" % (self.hg_api_key,self.metric_prefix, key)
graphiteudp.send(metric_path, value)
```

By way of example, in a use case where consensus is reached that a home security webcam as a device 450$_1$ is under attack, the user may be alerted that the camera is not communicating to a mobile device or a remote access computer. In this case, the system may provide a consensus alert to the owner of this loss of function, determined by the ring of trusted devices 450. In another (commercial) use case, such as a security system usable for stores, offices, theaters, stadiums, etc., a robust ring of trusted devices 450 may be used to alert one another when one ring is hacked or not responding. This system may identify ring subsets that are not working properly or compromised all the way down to individual devices using the techniques described herein. In another use case, new vertical services may be protected. These vertical services may be subject to, e.g., automotive cyberattacks as autonomous vehicles become more common. Health industry advances that 5G is likely to bring like may require these advanced techniques in order to prevent medical identity theft, and protect health privacy and medical data dispersion.

Discovered nodes dynamically added to the network may be referenced and polled to see if there is certain packet anomaly/dysfunctionality in the system and eventually if multiple sensors come to a consensus that one node is identified as dysfunctional in certain packet transfer, the IoT dashboard is alerted and the node can be highlighted in the system.

The blockchain node registrar 440 may be used to manage devices 450 within the secure physical network 460 in which user devices may operate. The registrar 440 may register all devices 450 in a blockchain registry on a blockchain platform based on an identifier, device functional behavior, and network packets as part of communication. This may be implemented, in some embodiments, as a method for storing information for a set of trusted devices by creating a software image for sharing by members of the set of trusted devices by one of the set of trusted devices. The method may further comprise agreeing to store the image for access by members of the set of trusted devices by a blockchain mechanism, storing the image on a virtual machine, receiving an access request for the image, and agreeing to the access request by the set of trusted devices via the blockchain mechanism. In some embodiments, the access request is a selected one of gaining access to the image by a new device and removing access to the image by one of the sets of trusted devices. In some embodiments, the access request is a request by a new device to join the set of trusted devices or a request by one of the trusted devices to relinquish membership in the set of trusted devices. In some embodiments, the method may comprise receiving a request to change the image, and agreeing to the change by the set of trusted devices via the blockchain mechanism. The change may be an update to the image, the virtual machine is in a cloud environment and the set of trusted devices may be a set of IoT devices.

The devices 450 and software images running on the devices may be registered by the registrar 440 in a blockchain-based environment of trusted devices 450 making up the user's secure physical network 460. The trusted device 450$_1$ may, e.g., create a software image for sharing among members of a set of trusted devices (i.e., members of the physical network 460) that includes the trusted device. A blockchain registrar 440 may store the software image on a machine, which may be a virtual machine, that is in communication with the set of trusted devices 450, and the blockchain registrar 440 may use the set of trusted devices 450 as peer members. A trusted device $450_1$ from the set of trusted devices 450 in the physical network 460 may receive, via the virtual machine, an access request for a software image from a requesting device from the set of trusted devices. The blockchain mechanism may authorize the access request by providing the software image to the requesting device.

In some embodiments, the circle of trusted network devices 450 creates a blockchain environment that provides a secure environment for implementation. That is, some embodiments provide a secure environment in which content can be shared among devices in the circle of trust that function as peers in a blockchain network. This may be performed, e.g., by utilizing a Loyal Virtual Machine ("Loyal VM" (LVM)) that supports a circle of trust by exchanging information from a utility pack, software images, and identities of joint owners with the circle of trust. The LVM may: 1) be a "Container" for utilities (e.g., including a portable operating system) located in utility pack and software images (e.g., text documents, photos, etc.) from software images; 2) reside on a machine (i.e., a physical computer or a virtual machine, which is a software emulation of a hardware computer that runs on one or more physical computers and is able to emulate the functionality of a physical computer system); 3) be portable in such a way that it can manage software images that are stored and played on any device from a set of trusted devices 450 (as a circle of trust) that are used exclusively by joint owners; and 4) use the set of trusted devices 450 as a blockchain mechanism (i.e., the set of trusted devices 450 are peers in a blockchain environment) that enables secure sharing of the utilities and software images among the devices in the set of trusted devices 450. An LVM may be distinguished from an Internet based VM in that the LVM utilizes interconnected devices in the set of trusted devices as a blockchain environment. The blockchain network may involve all or some of the devices 450 in the secure network.

The notifier/responder 442 may take action once a consensus has been reached that a particular device $450_1$ is experiencing an anomaly. In some implementations, the action may comprise providing a notification to a user. For example, an IoT dashboard of a user interface 452 on a device $450_1$ that supports the IoT dashboard may indicate the anomalous device as being problematic. This may be done, e.g., by a user smartphone as a device $450_1$ on the physical network 460 indicating that the refrigerator is producing far more data than it should be. In some instances, devices 450 within the physical network 460 may not have a high-resolution display—in such cases, more rudimentary indications may be provided, such as an audio voice describing the problem or an audio alert signal or LED light indicator.

In some embodiments, some other proactive response may be implemented in an attempt to automatically correct the problem. For example, if the refrigerator has been identified as a problematic device $450_1$ in the physical network 460, steps could be taken to isolate it from the physical network 460, and/or new "correct" software or operating system may be reloaded onto the device from a known secure image in an attempt to remove the corrupted software. In some implementations, when a denial of service attack is underway, based on abnormal behavior from a registered device within the consensus network, the system may choose to disconnect and/or isolate a device that is under an active DDOS. DDOS itself has characteristics that would be identified via the algorithms in use. If there were an attempt to disrupt normal traffic within the network, that flood of Internet traffic may be detected and would be classified as "abnormal" as the IoT device itself would have disrupted IP streams.

Figure 5:
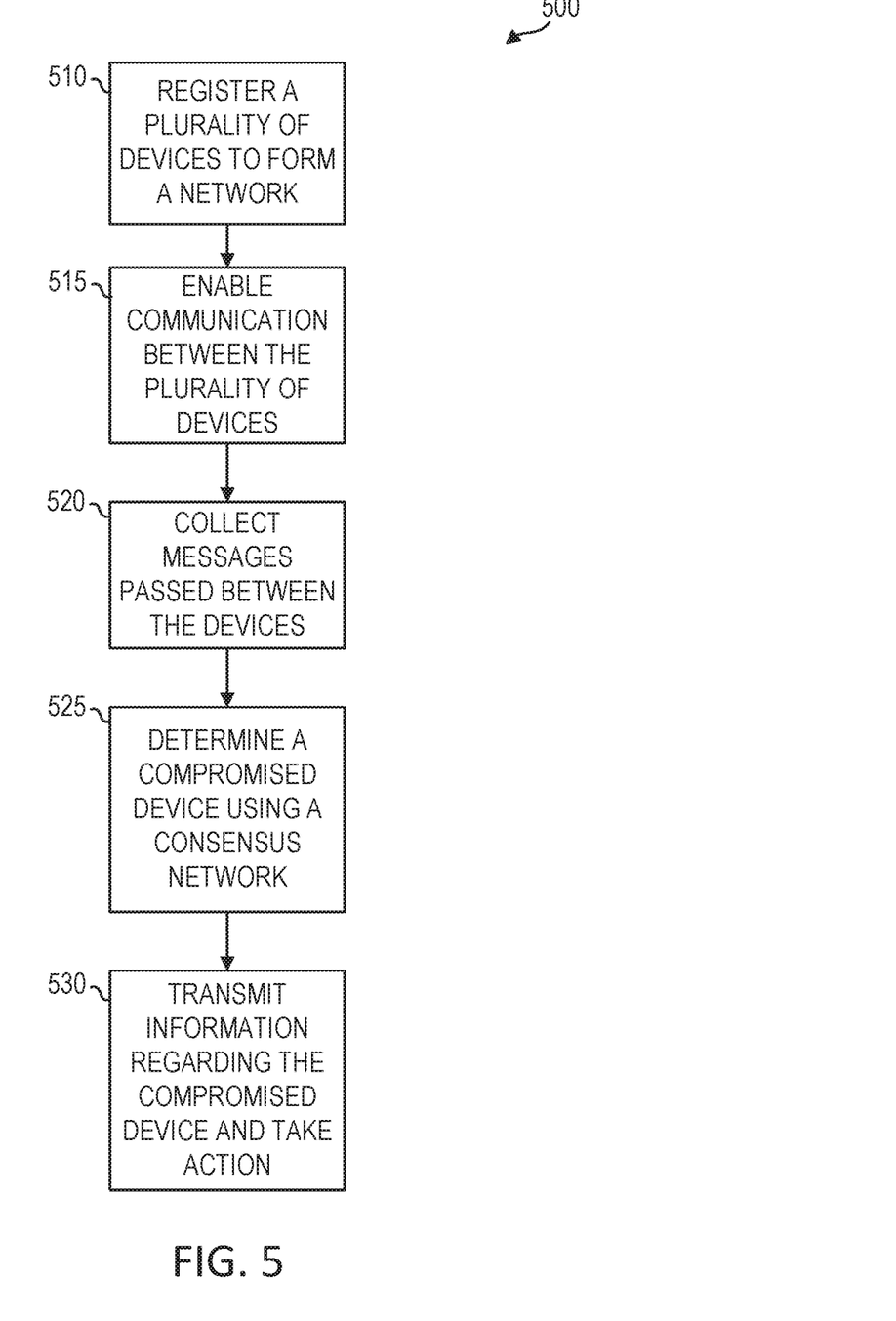
FIG. 5 is a flowchart of one or more embodiments of a process disclosed herein.

FIG. 5 is a flowchart that illustrates an example process 500 for device discovery and recovery, according to some embodiments. In operation 510, a plurality of devices 450 may be registered to form a secure physical network 460. The registration may include both manual registration, in which individual devices 450 are added to the physical network 460 along with their operating characteristics, and automatic registration, in which the devices 450 exchange information and are automatically added to the physical network 460. The blockchain node registrar 440 may help determine the device's 450 inclusion as being proper in the physical network 460. In operation 515, once the devices are securely entered as a part of the secure physical network 460, normal communications may occur both between the devices 450 in the network and between a device in the network and an external entity via network infrastructure components (which may also be considered devices 450), such as switches, gateways, routers, etc. Additionally, devices 450 that have been registered with the physical network 460 may receive consensus network components 410 that allow the device $450_1$ to participate in consensus decision making and that are matched to the capabilities of the device $450_1$. For example, a user interface component may differ based on the capabilities of the device—a simple LED controller for a device $450_1$ having only an LED output, and a display driver for a device having a high-resolution display screen.

In operation 520, messages that are passed between the devices 450 (as well as messages that are passed to and from respective devices 450) may be collected, where possible, by the message collector 415. These messages may serve as the basis for information that is utilized to determine the presence of an anomaly in the physical network 460. In operation 525, the compromise determiner 425 in one or more of the devices 450 may determine that a potential problem exists in one of the devices 450, based on a machine learning 430 classifier. The consensus determiner 435 may then be invoked in order to assess whether other devices within the network are able to reach a consensus, as described above, as to whether an actionable anomaly exists with a particular node.

In operation 530, information regarding a compromised device $450_1$ for which a consensus has been reached may be transmitted for display, e.g., on a user interface 452 of a device within the physical network 460 best able to display information about the anomaly on the compromised device $450_1$. This may be performed by the notifier/responder 442. In some instances, it may be possible to take additional action with respect to the compromised device $450_1$. In some instances, the compromised device $450_1$ may be blocked or removed from the physical network 460. In other cases, a new install of applications and/or operating system that is known to be non-corrupt may be provided and the device $450_1$ restarted and tested for anomalous behavior again.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for device discovery and recovery in a secure network comprising:
 registering a plurality of devices, wherein the devices form the secure network at a location;
 enabling communication between the plurality of devices;
 collecting messages passed between the plurality of devices;
 determining which one of the plurality of devices is a compromised device by using a consensus network that includes the plurality of devices of the secure network; and
 taking an action selected from the group consisting of: a) isolating the determined compromised device from the network; and b) reloading correct software or operating system to the determined compromised device from a known secure image;
 wherein:
 the consensus network allows the plurality of devices in the consensus network to sense a network or device problem and vote on an issue selected from the group consisting of: whether a problem exists, which device(s) may be impacted, and what the proper corrective action to take is.

2. The method of claim 1, wherein the messages are selected from a group consisting of a Service-oriented Architectures (SOA) protocol, a Representational State Transfer (REST) protocol, and a Message Oriented Protocol.

3. The method of claim 1, further comprising training a machine learning system to recognize a suspect device among the plurality of devices.

4. The method of claim 1, wherein the plurality of devices are members of a shared ledger network.

5. The method of claim 4, wherein the shared ledger network is a blockchain network.

6. The method of claim 4, wherein diagnostic operations are performed by other devices of the consensus network on a suspected device to make a determination of the compromised device.

7. The method of claim 1, further comprising providing a user interface to indicate which of the plurality of devices is compromised.

8. The method of claim 1, further comprising informing a user of a device in the secure network that is the compromised device.

9. The method of claim 1, wherein the action is reinstalling an application or operating system on the compromised device.

10. A device in a secure network, comprising:
 a processor configured to:
 register a plurality of devices, wherein the devices form the secure network at a location;
 enable communication between the plurality of devices;
 collect messages passed between the plurality of devices;
 determine which one of the plurality of devices is a compromised device by using a consensus network that includes the plurality of devices of the secure network; and
 take an action selected from the group consisting of: a) isolating the determined compromised device from the network; and b) reloading correct software or operating system to the determined compromised device from a known secure image;
 wherein:
 the consensus network allows the plurality of devices in the consensus network to sense a network or device problem and vote on an issue selected from the group consisting of: whether a problem exists, which device(s) may be impacted, and what the proper corrective action to take is.

11. The device of claim 10, further comprising training a machine learning system to recognize a suspect device among the plurality of devices.

12. The device of claim 10, wherein the plurality of devices are members of a blockchain network.

13. The device of claim 12, wherein diagnostic operations are performed by other devices of the consensus network on a suspected device to make a determination of the compromised device.

14. The device of claim 10, wherein the processor is further configured to create display data that informs a user of a device in the secure network that is the compromised device.

15. A computer program product for a device in a secure network, the computer program product comprising a non-transitory computer readable storage medium having computer-readable program code embodied therewith to, when executed on a processor:
 register a plurality of devices, wherein the devices form the secure network at a location; enable communication between the plurality of devices;
 collect messages passed between the plurality of devices; and determine which one of the plurality of devices is a compromised device by using a consensus network that includes the plurality of devices of the secure network, take an action selected from the group consisting of: a) isolating the determined compromised device from the network; and b) reloading correct software or operating system to the determined compromised device from a known secure image, wherein the consensus network allows the plurality of devices in the consensus network to sense a network or device problem and vote on an issue selected from the group consisting of: whether a problem exists, which device(s) may be impacted, and what the proper corrective action to take is.

16. The computer program product of claim 15, wherein the code further causes the processor to:
 continuously identify current location information of the user device and user route location information of a user route, by receiving, via at least one of the SOSIs, information from a VA selected from the group consisting the user device VA, the vehicle device VA, and the stop VA.

* * * * *